United States Patent [19]

Shiraishi et al.

[11] Patent Number: 4,881,136
[45] Date of Patent: Nov. 14, 1989

[54] METHOD AND APPARATUS FOR DETECTING MINUTE DEFECTS ON MAGNETIC DISK BY MONITORING BOTH AMPLITUDE DECREASE AND PHASE SHIFT OF A REPRODUCED SIGNAL

[75] Inventors: Kazuhisa Shiraishi; Kazuo Nakagoshi; Takuji Ogawa, all of Odawara, Japan

[73] Assignee: Hitachi, Ltd., Tokyo, Japan

[21] Appl. No.: 927,960

[22] Filed: Nov. 7, 1986

[30] Foreign Application Priority Data

Nov. 8, 1985 [JP] Japan ................................ 60-248809

[51] Int. Cl.$^4$ ...................... G11B 5/455; G11B 27/36; G01R 33/12
[52] U.S. Cl. ...................................... 360/25; 360/31; 360/45; 324/212
[58] Field of Search ....................... 360/25, 31, 45, 53; 324/210–212, 227; 369/53, 54, 58

[56] References Cited

U.S. PATENT DOCUMENTS

| | | | |
|---|---|---|---|
| 3,562,635 | 2/1971 | Parker | 360/31 |
| 3,659,195 | 4/1972 | Cardozo et al. | 324/212 |
| 3,686,682 | 8/1972 | Behr et al. | 324/212 |
| 3,761,905 | 9/1973 | Hollstein, Jr. et al. | 360/25 |
| 3,826,975 | 7/1974 | Geller | 324/212 |
| 4,142,215 | 2/1979 | Roberts | 360/45 |
| 4,394,695 | 7/1983 | Mahon | 360/53 |
| 4,604,660 | 8/1986 | Horie et al. | 360/45 |
| 4,612,586 | 9/1986 | Sordello et al. | 360/45 |
| 4,656,420 | 4/1987 | Felleisen et al. | 324/212 |
| 4,754,222 | 6/1988 | Felleisen et al. | 324/212 |

FOREIGN PATENT DOCUMENTS 3238077 4/1984 Fed. Rep. of Germany .
59-21730 12/1984 Japan .

OTHER PUBLICATIONS

Katz et al., IEEE Transactions on Magnetics, vol. Mag-15, No. 3, May 1979, pp. 1050–1053.

Primary Examiner—Alan Faber
Assistant Examiner—Surinder Sachar
Attorney, Agent, or Firm—Antonelli, Terry & Wands

[57] ABSTRACT

Because of increase in data recording density on a magnetic disk in recent years, a minute defect which posed no problem in the past exerts adverse influence upon the recording and reproducing characteristics. An object of the present invention is to provide a method and an apparatus for detecting minute defects on a magnetic disk. In order to achieve this object, the present invention was made on the basis of the recognition that a large defect on the magnetic disk largely decreases the amplitude of the reproduced signal and shifts its phase, whereas a small defect does not decrease the amplitude of the reproduced signal so largely but causes a phase shift. Therefore, defects on the magnetic disk are detected by monitoring the amplitude decrease and phase shift of the reproduced signal.

6 Claims, 3 Drawing Sheets

METHOD AND APPARATUS FOR DETECTING MINUTE DEFECTS ON MAGNETIC DISK BY MONITORING BOTH AMPLITUDE DECREASE AND PHASE SHIFT OF A REPRODUCED SIGNAL

BACKGROUND OF THE INVENTION

The present invention relates to a method and an apparatus for detecting defects in a recording medium, and in particular to a method and an apparatus for detecting an extremely minute defect on a recording medium for high density recording such as a magnetic disk.

In recent years, magnetic disk units have been required to have increased recording capacities. Therefore, the recording capacity per head disk assembly (hereafter referred to as HDA) has now reached 2.5 gigabytes (G bytes). It is expected that the surface recording density will increase by approximately ten times the present density in the future. A problem incurred when the surface recording density is increased is the occurrence a defect on the recording medium. As the surface recording density (the number of bits recorded per unit area) is increased, the area of the recording medium occupied by one bit is correspondingly decreased. Accordingly, minute defects which posed no problems for the surface recording density in the past exert bad influence upon the information (data) writing and reading operation.

This will now be described by taking the improvement of the surface recording density over the past ten years as an example. Whereas the surface recording density of the magnetic disk unit was 1 megabits/(inch)$^2$ approximately 15 years ago, it has been raised to 25.6 Mbits/(inch)$^2$ in recent years. That is to say, the surface recording density of the magnetic disk unit has been increased by 25.6 times. Assuming that a defect within an area in which one bit data is recorded of the disk is not changed, for example, the ratio of the defect within an area in which one bit data is recoded of a disk unit in recent years amounts to 25.6 times that of a disk unit in the past. Accordingly, a defect which did not cause any problem in the past has posed a serious problem in recent years.

Detection of minute defects on the disk is an important subject for maintaining the reliability of the magnetic disk unit. In a known method for detecting defects, an amplitude signal is recorded on the recording medium beforehand and the variation in the amplitude value of the amplitude signal is measured to detect defects.

However, the amplitude variation is caused by not only defects but also other various factors. In the conventional method for detecting amplitude variation, therefore, a number of changes which have no relation to actual readout reliability are extracted. Thus the conventional method is not suitable to detection of minute defects, resulting in a problem.

A method obviating this problem of the amplitude variation detection method is disclosed in JP-A-No. 59-217230. In this method, minute defects are detected by measuring the variation in phase direction of the peak point on the amplitude of the reproduced signal waveform. If only the phase variation of the peak value is detected as described in the aforementioned publication, however, all of a plurality of reproduced signal frequencies must be measured and inspected. This results in a problem of inefficient disk inspection.

SUMMARY OF THE INVENTION

An object of the present invention is to provide a method and an apparatus for detecting defects on a recording medium, which is free from the above described problems of the prior art and which is capable of detecting minute defects on the recording medium efficiently.

In order to achieve the above described object, the method for detecting defects on the recording medium in accordance with one aspect of the present invention comprises steps of detecting the reproduction level, i.e., the peak-to-peak value of the amplitude signal reproduced from the recording medium, concurrently detecting the interval in phase direction between peaks of the aforementioned amplitude signal, and detecting defects of the recording medium on the basis of the drop in the reproduction level and the shift in phase direction of the peak signal.

The apparatus for detecting defects on the recording medium in accordance with one aspect of the present invention comprises means for detecting the amplitude width at the peak point of the reproduced signal read out from the recording medium, means for detecting the interval in phase direction between peak points of the reproduced signal, and determination means for determining the presence of a defect when the above described means indicate that the amplitude width at the peak point is smaller than the predetermined amplitude width or the interval between peak points is not in the predetermined interval width. Further, the peak point detected by the defect detection method and apparatus is a peak point of a frequency in the frequency band of the amplitude signal at which the peak value of the second derivative is minimized. In accordance with the present invention, the above described recording medium is a magnetic disk.

DESCRIPTION OF THE PREFERRED EMBODIMENTS

Prior to describing a method and an apparatus for detecting defects on the recording medium according to an embodiment of the present invention, the principle of the present invention will now be described to facilitate understanding of the present invention.

Figure 2:
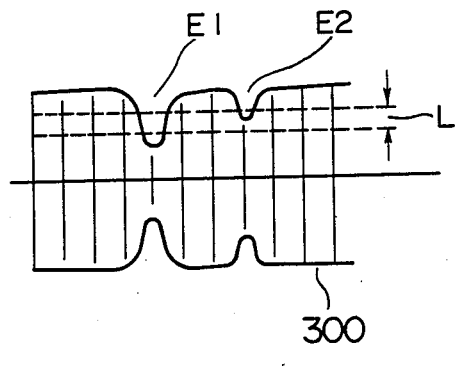
FIG. 2 shows the influence of a defect on the recording medium upon the reproduced waveform.
Figure 4:
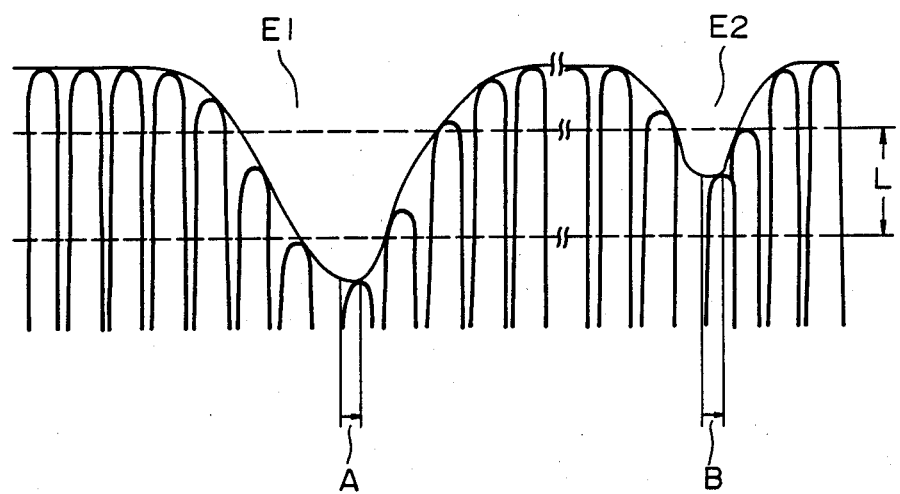
FIG. 4 is a partially expanded view of FIG. 2.

The influence of a defect on the recording medium upon the reproduced signal depends upon the size of the defect, which will now be described by referring to FIG. 2 and FIG. 4 which is a partially expanded view of FIG. 2. As shown in a reproduced signal 300, a relatively large defect on the recording medium is reproduced as a defect signal E1 having a largely reduced amplitude and a shifted phase A, whereas a relatively small defect is reproduced as a defect signal E2 which is not so largely reduced in amplitude but shifted by B in phase. The reproduced signal shown in FIG. 2 is an envelope derived respectively coupling the maximum values and the minimum values of a plurality of amplitude signals although the amplitude signals are omitted in FIG. 2.

For detecting all defects on the recording medium, therefore, it is desirable to detect a decrease in amplitude and a shift in phase direction. In accordance with the first feature of the present invention, therefore, a frequency signal having a predetermined amplitude is written onto the recording medium before-hand and the level of the frequency signal read out from the recording medium is detected to measure the decrease in amplitude while the peak point of the frequency signal is detected to measure the shift in phase.

Figure 3:
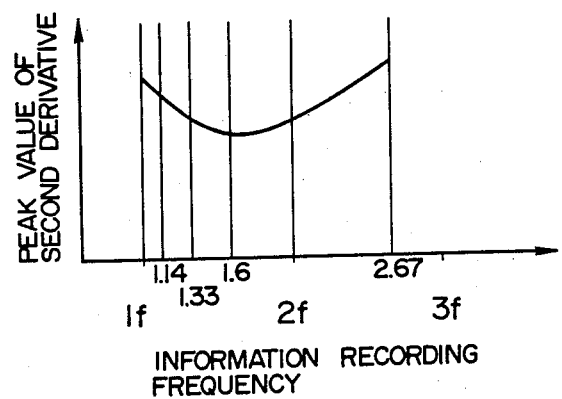
FIG. 3 shows the relationship between information recording frequencies recorded on the recording medium and peak values of the second derivative derived by reproducing the frequencies.

In detecting the phase shift and amplitude decrease, use of all frequency signals used for recording and reproduction lowers the inspection efficiency. In accordance with the second feature of the present invention, therefore, the detection of defects is performed on the basis of a reproduced signal frequency causing the largest phase shift. That is to say, a frequency having the least sharpness at the peak point of the reproduced signal and having high sensitivity to a defect on the recording medium is used to detect defects. The above described frequency having the least sharpness at the peak point of the reproduced signal is defined as follows. That is, it is first assumed that the resolution of a plurality of reproduced signal frequencies (i.e., the readout voltage ratio of the highest reproduced signal frequency to the lowest reproduced signal frequency) is approximately 70%. For each of a plurality of reproduced signal frequencies, a composite wave composed of the fundamental frequency component and odd-numbered harmonic components is considered. A signal frequency corresponding to a composite wave having the least sharpness at the peak point, i.e., a signal frequency corresponding to a composite wave having the lowest peak value of the second derivative is defined as the above described frequency having the least sharpness at the peak point of the reproduced signal. In the case of 2-7 RLLC (Run Length Limited Code) modulation technique, for example, a frequency which is 1.6 times as high as the fundamental wave shown in FIG. 3 is desired. Values of a plurality of reproduced signal frequencies are defined under various conditions such as the S/N ratio condition, the pattern peak shift condition contradicting the S/N ratio condition, and the low-pass filter cutoff frequency condition. The 2-7 RLLC modulation technique is a known art as described in U.S. Pat. No. 4,604,660, for example.

In accordance with the present invention based upon the above described principle, the peak value (amplitude) of the reproduced signal is measured at an arbitrary detection level of a frequency signal having the lowest peak value of the above described second derivative, and the phase at the peak point is detected to measure the phase shift, resulting in a high detection ratio of defects.

An embodiment of an apparatus for detecting defects on the recording medium according to the present invention based upon the above described principle will now be described in detail by referring to FIG. 1.

Figure 1:
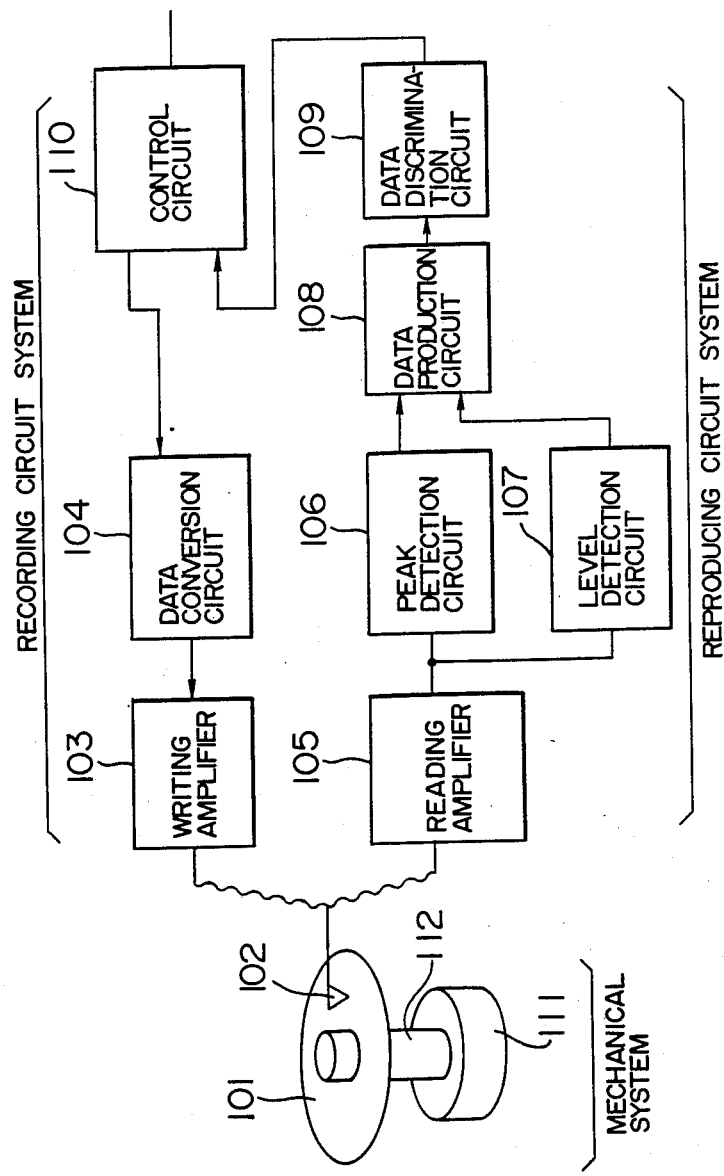
FIG. 1 shows an embodiment of an apparatus for detecting defects on a recording medium according to the present invention.

A defect detecting apparatus shown in FIG. 1 is composed of a mechanical system for rotating a magnetic disk 101 to be inspected, a recording circuit system for recording information onto the magnetic disk 101, a reproducing circuit system for reading information out of the magnetic disk 101, and a control circuit 110 for controlling them.

The mechanical system is composed of a motor 111 for rotating the magnetic disk via a spindle 112, a magnetic head 102 for recording/reproducing information on a desired track of the magnetic disk 101, and an actuator for moving the head in the radial direction of the disk. The actuator is not illustrated. With the magnetic disk 101 rotated by the motor 111, the magnetic head 102 is moved to a desired track on the magnetic disk 101 by the actuator.

The recording circuit system is composed of a data conversion circuit 104 for modulating the write data supplied from the control circuit 110 by using, for example, the 2-7 RLLC modulation technique and a writing amplifier 103 for amplifying the output data of the modulation circuit. The recording circuit system writes data onto the disk 101 via the magnetic head 102.

The reproducing circuit system characteristic of this embodiment is composed of a reading amplifier 105 for amplifying the reproduced signal read out from the disk 101 via the magnetic head 102, a peak detection circuit 106 for detecting the peak point position of the amplitude of the reproduced signal, a level detection circuit 107 for detecting decrease in the amplitude of the reproduced signal at an arbitrary position, a data production circuit 108 supplied with outputs of the peak detection circuit 106 and the level detection circuit 107, and a data discrimination circuit 109. The data production circuit 108 does not produce data for a reproduced signal having an amplitude reduced below a certain level even if a peak point has been detected. The data production circuit 108 demodulates only a reproduced signal reaching a predetermined amplitude to provide data. The data discrimination circuit 109 discriminates the position of the peak point of the data supplied from the data production circuit 108. By using the output of the discrimination circuit 109, the error position of the data, i.e., the defect of the data is detected.

Each circuit block in FIG. 1 is a known circuit to a person skilled in the art. For example, the peak detection circuit 106 is disclosed in JP-A-No. 60-124008. JP-A-No. 59-60719 also discloses the related technology.

If such a detecting apparatus for detecting defects on recording medium like the apparatus of FIG. 1 has four or more kinds of frequencies for recording information as in the 2-7 RLLC modulation technique, a recording frequency having the minimum peak value of the second derivative at the peak point of the amplitude of the reproduced signal read out from the disk 101 via the head 102 is the recording frequency which is most susceptible to a defect on the medium. In the present embodiment, the phase shift at peak points of the reproduced signal having the above described recording frequency is detected, and in detection, the width of the discrimination window of the data discrimination circuit 109 is arbitrarily reduced from the regular time, and the shift of the peak point at every magnetization transition position recorded on the disk 101 is detected. Further, in the present embodiment, an error position of data for the above described recording frequency supplied from the data discrimination circuit 109 is detected in the control circuit 110 by displacing a plurality of times the phase of the above-mentioned recording frequency according to the magnetization transition positions. Thus the defect position on the disk is detected. In case of the 2-7 RLLC modulation technique, for example, the frequency 1.6 f has the minimum peak value of the second derivative as shown in FIG. 3. It is necessary to effect detection six times according to magnetization transition positions while displacing the phase.

It is also possible to arbitrarily set the level of the level detection circuit 107 to detect the decrease in the amplitude of the reproduced signal concurrently with the above described phase shift detection at the peak point of the reproduced signal.

The present embodiment brings about effects listed below.

(1) It is possible to accurately determine the defect on the medium by detecting the phase shift of the peak point at every magnetization transition position for a reproduced signal most susceptible to defects on the medium.

(2) It is possible to concurrently determine a defect on the medium which does not cause phase shift at the peak point of the reproduced signal but which significantly reduces the amplitude value.

(3) Therefore, it is possible to accurately determine defects on the recording medium and assure the quality of the recorded information.

Owing to simultaneous detection of the amplitude variation and the phase shift of the reproduced signal as described above, the present invention brings about effects listed below.

(1) It is possible to determine a defect on the medium which causes little phase shift at the peak point of the reproduced signal but which significantly reduces the amplitude value.

(2) It is possible to accurately detect the phase shift at the peak point of the reproduced signal.

(3) Therefore, it is possible to determine defects on the recording medium and assure the quality of the recorded information.

We claim:

1. A method for detecting defects on a recording medium, comprising the steps of:
    recording onto the recording medium an amplitude signal corresponding to data to be written and coded in accordance with a 2-7 RLLC coding technique, the amplitude signal having a frequency which minimizes the peak value of the second derivative thereof within the frequency band of the amplitude signal;
    reproducing the amplitude signal recorded on the recording medium;
    detecting intervals of peak points of said reproduced amplitude signal;
    detecting the peak-to-peak amplitude at each peak pint of said reproduced amplitude signal; and
    determining a defect on the recording medium when said peak-to-peak amplitude is smaller than a predetermined value or the interval between said peak points of said amplitude signal is outside of a predetermined range.

2. A method for detecting defects on a recording medium according to claim 1, wherein said recording medium comprises a magnetic disk.

3. A method for detecting defects on a recording medium according to claim 1, wherein the amplitude signal is a continuous signal.

4. An apparatus for detecting defects on a recording medium, comprising:
    means for generating an amplitude signal having a frequency which minimizes the peak value of the second derivative thereof within the frequency band of said amplitude signal as a signal for recording onto said recording medium;
    signal recording means for recording said amplitude signal coded by data to be written in accordance with a 2-7 RLLC coding technique onto said recording medium;
    signal reproducing means for reproducing said amplitude signal recorded on said recording medium;
    amplitude detecting means for detecting a peak-to-peak amplitude at a peak point of said amplitude signal reproduced by said signal reproducing means;
    interval detecting means for detecting an interval in phase direction between peak points of said amplitude signal reproduced by said signal reproducing means;
    determination means for determining a defect on the recording medium when an amplitude width shorter than a predetermined amplitude width is detected by said amplitude detecting means and when a peak interval different from a predetermined peak interval is detected by said interval detecting means.

5. An apparatus according to claim 4, wherein said amplitude detecting means includes a level detection circuit for comparing the peak-to-peak amplitude of said reproduced amplitude signal with a predetermined reference level, and wherein said interval detecting means includes a peak detection circuit for detecting the peak signal of the reproduced amplitude signal and a discrimination circuit for discriminating the peak signal detected by said peak detection circuit by means of a discrimination window having a predetermined width.

6. An apparatus according to claim 4, wherein said amplitude signal is a continuous signal.

* * * * *